July 28, 1925.
J. N. ATTEBERRY
1,547,890
MILK AND CREAM TESTING SCALE
Filed Dec. 20, 1923
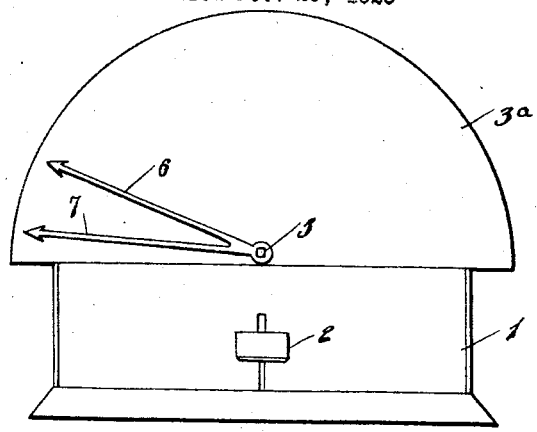
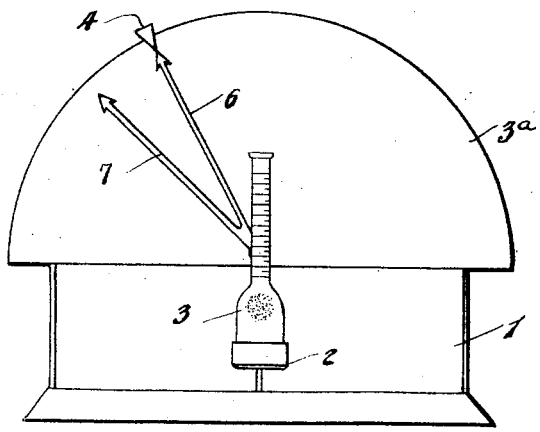
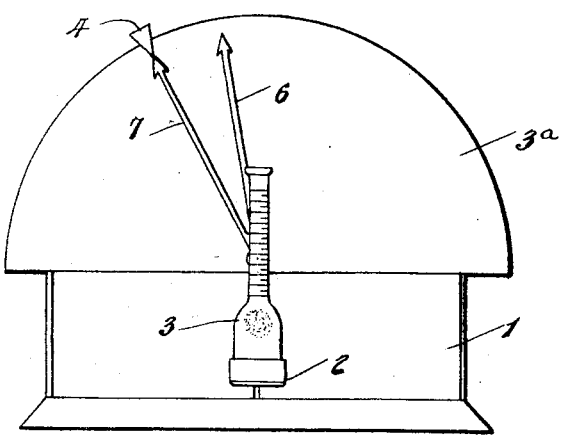
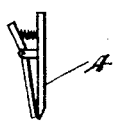
Inventor
J. N. Atteberry,
By
Attorney Patented July 28, 1925.

1,547,890

UNITED STATES PATENT OFFICE.

JOHN N. ATTEBERRY, OF ATKINSON, NEBRASKA.

MILK AND CREAM TESTING SCALE.

Application filed December 20, 1923. Serial No. 681,842.

*To all whom it may concern:*

Be it known that I, JOHN N. ATTEBERRY, a citizen of the United States, residing at Atkinson, in the county of Holt and State of Nebraska, have invented certain new and useful Improvements in Milk and Cream Testing Scales; and I do hereby declare the following to be a full, clear, and exact description of the invention, such as will enable others skilled in the art to which it appertains to make and use the same.

In the testing of milk and cream as ordinarily practiced, it is necessary to balance the scale with the bottle containing the milk or cream and in the handling of the weight the latter usually accumulates grease and other matter, thereby preventing accuracy in the test.

In accordance with the present invention, the balancing of the scales by weights is not necessary and instead the scale is provided with an adjustable indicator and a pair of connected pointers, the indicator being adjusted to the first pointer to correctly designate its position when the bottle is empty, the second pointer occupying a position opposite the indicator when the bottle is filled, the test being conducted without necessitating the use of balancing weights.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a front view of a testing scale embodying the invention,

Figure 2 is a view similar to Figure 1 showing the first step in making a test, the empty bottle being in position and the indicator applied to the scale so as to aline with the first pointer, Figure 3 is a view similar to Figure 2, showing the second step after the bottle has received a charge, the second pointer occupying the position of the first pointer, and Figure 4 is a side view of the adjustable indicator.

Corresponding and like parts are referred to in the following description and designated in the several views of the drawings by like reference characters.

The numeral 1 designates a set of weighing scales such as generally employed for testing milk and cream and 2 is the support for receiving the bottle 3 or the like container adapted to receive the predetermined quantity of milk or cream to be tested, which usually consists of nine grams by weight. The dial 3ª is of semicircular form and an indicator 4 is adapted to be attached to the upper or curved edge thereof. This indicator is in the form of a spring clip, as indicated most clearly in Figure 4.

In accordance with the invention, a pair of connected pointers is attached to the shaft 5 of the scales and moves therewith over the dial. These pointers are designated by the numerals 6 and 7, respectively, and may be constructed in any preferred way so as to move in unison.

When using testing scales embodying the invention, the empty bottle or container 3 is placed upon the support 2 which is depressed and effects a movement of the pointers 6 and 7. The indicator 4 is attached to the edge of the dial 3 so as to aline with the first or forward pointer 6, as indicated in Figure 2. The bottle 3 is now removed from the support and is supplied with a predetermined quantity of milk or cream, usually nine grams, and is replaced upon the support 2 which is further depressed and effecting an additional movement of the pointers with the result that the pointer 7 assumes the position previously occupied by the pointer 6, provided the product contains the proper proportion of ingredients, and any variation of the pointer 7 from the position previously occupied by the pointer 6 will necessitate the subtracting or the adding of milk or cream to the quantity being tested, so that the quality of the article tested may be readily ascertained.

What is claimed is:

1. Testing scales comprising a support for a container, a dial, forward and rearward pointers controlled in their movements by said support, and an indicator adjustable on the dial for movement into alinement with the forward pointer after it has come to rest during the weighing of the empty container, whereby to indicate the point at which the rearward pointer must come to rest when a predetermined quantity of material has been placed in the container.

2. Testing scales comprising a support for a container, a dial, forward and rearward pointers having a relatively fixed position and controlled in their movements by said support, and an indicator adjustable on the dial for movement into alinement with the forward pointer after it has come to rest during the weighing of the empty container, whereby to indicate the point at which the rearward pointer must come to rest when a predetermined quantity of material has been placed in the container.

In testimony whereof I affix my signature in presence of two witnesses.

JOHN N. ATTEBERRY.

Witnesses:
FRED N. SWINGLEY,
J. B. ACKERSON.